April 10, 1945. C. A. MARTIN 2,373,324
VALVE
Original Filed April 1, 1937
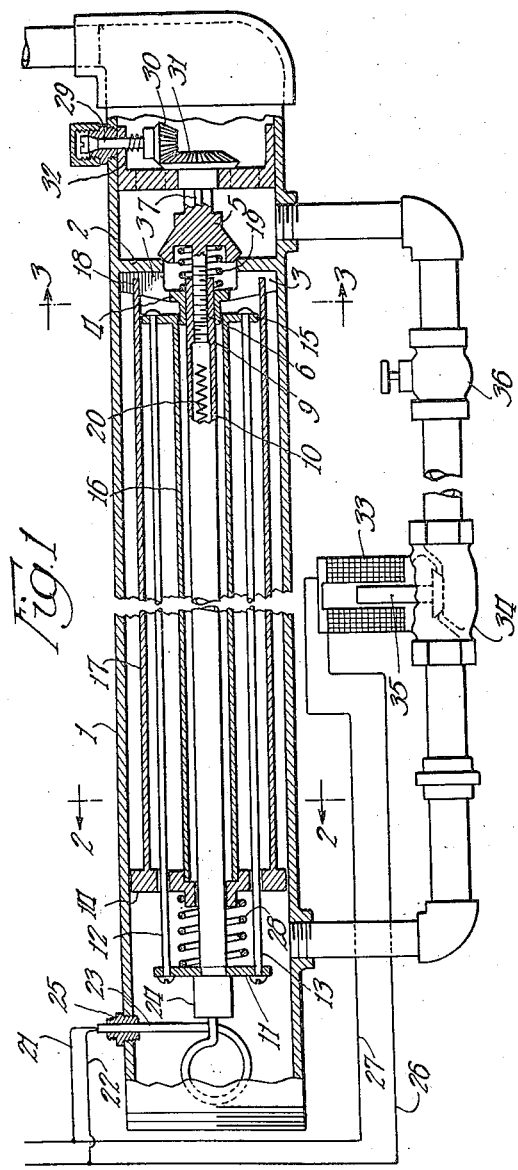
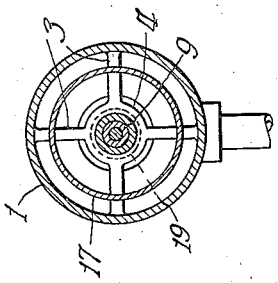
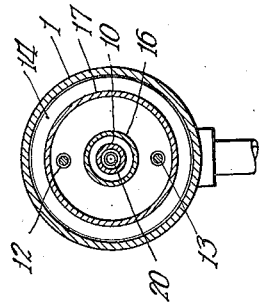
Inventor
Charles A. Martin Patented Apr. 10, 1945

2,373,324

UNITED STATES PATENT OFFICE 2,373,324

VALVE

Charles A. Martin, Chicago, Ill.

Original application April 1, 1937, Serial No. 134,448, now Patent No. 2,249,844, dated July 22, 1941. Divided and this application July 18, 1941, Serial No. 402,915

10 Claims. (Cl. 137—139)

The present invention relates to thermal expansion valves of the general type described in my Patent No. 1,697,432 and has for its purpose the provision of a valve of this character in which a plurality of expanding elements can be heated by a single heat element so as to give a valve stroke equal to the sum of their expansions. The invention contemplates also a valve of this character in which compensating expansion elements are employed to compensate for the temperature of the fluid surrounding the heated expansion elements.

The present invention is a division of my application Serial No. 134,448 filed April 1, 1937, for "Control system" upon which Patent No. 2,249,844 was granted on July 22, 1941, and is particularly directed to the features of the valve originally disclosed and claimed in that application.

The novel features and advantages of my invention will appear more fully as the description proceeds, reference being had to the accompanying drawing wherein a preferred form of the invention is shown. It is to be understood however that the drawing and description are illustrative only and are not to be taken as limiting the invention except insofar as it is limited by the claims.

In the drawing:

Fig. 1 is a sectional view through a thermal expansion valve embodying my invention;

Fig. 2 is a sectional view taken on the line 2—2 of Fig. 1; and

Fig. 3 is a sectional view taken on the line 3—3 of Fig. 1.

Referring now in detail to the drawing, the structure shown in Fig. 1 utilizes an electrically operated thermal expansion valve such as is described in my Patent No. 1,697,432, but of an improved design. In the improved valve two expanding elements are heated instead of one by the electric heat element controlled by the temperature controller. These elements are so assembled so as to give a valve stroke equal to the sum of their expansions. Compensating expansion elements, for both of the electrically heated expansion elements, compensate for the surrounding temperature of the heated elements. The thermal expansion valve has a tube case 1 having threads on each end. The threads on the left end of the tube connect to the fuel supply line, whereas, the threads on the right end of the tube connect through suitable pipe fittings to the burner of a furnace.

Within the tube case 1 a valve seat 2 is sealed, having a circular solid section except for the valve opening and ribs 3 supporting a hub 4. The opening in the seat is closed, or throttled by a valve 5 having a threaded extension 6 to the left and a key-slotted extension 7 to the right. The threaded extension 6 screws into a threaded plug 9 sealed to the end of an operating tube 10 having a positive coefficient of thermal expansion. The other end of the operating tube 10 is sealed to a circular disc 11, and the disc 11 is slidably fastened on a pair of compensating rods 12 and 13 by means of screws. The rods 12 and 13 have a positive coefficient of thermal expansion equivalent to that of the operating tube 10 and are slidable through holes in a support bar 14. The other ends of rods 12 and 13 are passed through a circular disc 15 and held in place by means of screws.

The disc 15 is slidable over the hub 4 of the valve seat 2 and is fixed to a secondary operating tube 16 having a positive coefficient of thermal expansion also equivalent to that of operating tube 10. The opposite end of the tube 16 is fixed to the bar 14. Also fixed to the bar 14 is a compensating tube 17 which also has the same coefficient of thermal expansion as that of the operating tube 10. The other end of the compensating tube 17 slides into slots 18 in the ribs of the valve seat 2 and is held in a fixed position both by the pressure of fuel against the under side of the valve and by the pressure exerted by a spring 19. It will be observed that in the drawing the total effective length of the compensating tube 17 and the rods 12 and 13 is equal to the total effective length of the tubes 10 and 16. Since they all have equal coefficients of expansion the total expansion of the operating tubes will equal the total expansion of the compensating means for the same temperature change.

Within the operating tube 10 is an electrical heating element 20 wound on a non-conducting frame (not shown) insulating it from the tube 10. The terminals 21 and 22 of the heating element are protected with flexible lead tubing 23 within the valve case 1. The tubing 23 is sealed to a cap 24 which in turn is sealed to the operating tube 10, making a fluid-tight seal throughout. The lead cable extends through a stuffing box 25 screwed into the valve case 1.

The terminals 21 and 22 connect to the power lines 26 and 27 and the current through the lines is controlled in the manner shown in my parent application. Electrical current through the heater 20 causes a rise in temperature of the tube 10, expanding it and increasing its length. The free end of tube 10 into which the threaded stem 6 of valve 5 is screwed moves to the right, sliding through the guide hole in the hub 4 of the valve seat 2, and pushes the valve 5 away from its seat to increase its opening. Heat dissipated by the operating tube 10 increases the temperature of the secondary tube 16 which also expands to increase its length. The free end of this tube slides over the hub 4 of the valve seat 2 to the right and moves the disc 15, the rods 12 and 13, the disc 11 and the operating tube 10 attached to it, to the right to give the valve 5 a further opening; that is, the opening of valve 5 equals the sum of the expansion of tubes 10 and 16 due to the electrical heating effect. The compensating rods 12 and 13 and the compensating tube 17 are completely surrounded by the fluid under control and respond to its temperature. A rise in temperature increases the length of both the rods 12 and 13 and the tube 17. These elements, in expanding, move the valve 5 to the left in the direction to close it to compensate for the heating effect of the fluid under control on the tubes 10 and 16 which operate the valve 5 to the right in a direction to open it. The magnitude of opening of the valve 5 is therefore proportional to the sum of the difference in temperatures between the operating tubes 10 and 16 and the compensating elements comprising the rods 12 and 13 and the tube 17. When the current to the heater 20 is disconnected the operating elements 10 and 16 decrease in temperature to move the valve 5 in the direction to close it. If the operating elements are allowed to cool to the same temperature as the fluid under control the valve 5 attains its original manual adjustment regardless of whether there has been a change in the temperature of the fluid under control.

If for a particular control operation it is desired to have a greater opening of the valve 5 for higher fluid temperatures, to compensate for the expansion of the fluid, the compensating elements are made of material having a lower coefficient of thermal expansion than that of tubes 10 and 16. A spring 28 is used to provide protection for the valve mechanism should the valve 5 be adjusted to seat itself before the operating elements have cooled to the surrounding fluid temperature. The spring keeps the disc 11 against the screw heads in the rods 12 and 13 and keeps the rods under tension in normal operating conditions. If the valve seats, and there is further contraction of the operating elements, the disc 11 is pulled forward against the spring pressure and slides on the rods 12 and 13.

Manual adjustment of the valve 5 is obtained by turning an adjusting stem 29. Attached to the stem is a pinion gear 30 which is held in mesh with a bevel gear 31 by a bracket 32. In the hub of the bevel gear 31 is a key which extends into the key-slot of the stem 7 of the valve 5. Rotation of the screw head adjusting stem 29 in a clockwise direction turns the valve 5 in the same direction and screws its threaded extension into the threaded end 9 of the expansion tube 10 to move the valve in a direction toward the seat to close it. To open the valve 5 the screw head adjusting stem 29 is turned in a counterclockwise direction. Valve 5 is therefore manually adjusted to either a closed position or a slightly open position. In the latter case the fuel admitted to the furnace must be insufficient to maintain the operating control temperature.

Power lines 26 and 27 also connect to a coil 33 of a solenoid valve 34 having a plunger 35. The solenoid valve 34 is in a by-pass around the main valve 5 and seat 2 of the thermally controlled expansion valve. In the by-pass line another hand operated valve 36 limits the flow through the by-pass when the solenoid operates.

From the above description, it is believed that the construction and operation of the devices embodying the invention shown herein will be readily apparent to those skilled in this art. The specific advantages obtained by the present invention have been discussed herein in connection with the detailed construction. The invention in its broader aspect however is not limited to the details of construction and electrical arrangement disclosed herein.

Having thus described my invention, what I claim as new and desire to secure by Letters Patent is:

1. A valve moving mechanism of the character described for controlling the flow of fluid comprising a valve, two thin-walled metal tubes having a thermal coefficient of expansion and responding to surrounding temperatures, one of said tubes assembled to surround the other of said tubes, means for electrically heating the aforesaid tubes, cooperating elements having a thermal coefficient of expansion and responding to surrounding temperatures, said cooperating elements interconnected with said electrically heated tubes to give a valve movement equal to the difference in the combined expansions of the electrically heated tubes and the combined expansions of said elements for responding to surrounding temperatures.

2. A valve of the character described for controlling the flow of fluid, said valve comprising a casing through which the fluid flows, a plurality of operating tubes in said casing, said tubes having a positive thermal coefficient of expansion and one of said tubes encircling the other, a valve affixed to one end of the inner operating tube, a valve seat adjacent said end adapted to be engaged by said valve, tension means connecting the other end of said inner operating tube to the end of the outer operating tube adjacent said valve, spring means urging said tubes in such direction as to maintain tension on said tension means, and rigid means limiting the movement of said operating tubes and tension means toward the valve.

3. A valve of the character described for controlling the flow of fluid, said valve comprising a casing through which the fluid flows, a plurality of operating tubes in said casing, said tubes having a positive thermal coefficient of expansion and one of said tubes encircling the other, a valve affixed to one end of the inner operating tube, a valve seat adjacent said end adapted to be engaged by said valve, tension means connecting the other end of said inner operating tube to the end of the outer operating tube adjacent said valve, spring means urging said tubes in such direction as to maintain tension on said tension means, and rigid means limiting the movement of said tubes and tension means toward the valve, said tension means comprising expansion rods in the path of the fluid flowing through the valve casing whereby to respond to the temperature thereof.

4. A valve of the character described for controlling the flow of fluid, said valve comprising a casing through which the fluid flows, a plurality of operating tubes in said casing, said tubes having a positive thermal coefficient of expansion and one of said tubes encircling the other, a valve affixed to one end of the inner operating tube, a valve seat adjacent said end adapted to be engaged by said valve, rigid means connecting the other end of said inner operating tube to the end of the outer operating tube adjacent said valve, a spring urging said valve toward open position, and rigid means limiting the movement of said outer tube toward the valve, said last named rigid means comprising a thermal expansion member extending lengthwise of the valve casing and in the path of fluid flowing through said valve casing.

5. A valve of the character described for controlling the flow of fluid, said valve comprising a casing through which the fluid flows, a plurality of operating tubes in said casing, said tubes having a positive thermal coefficient of expansion and one of said tubes encircling the other, a valve affixed to one end of one operating tube, a valve seat adjacent said end adapted to be engaged by said valve, tension means connecting the other end of said last named tube to the end of the other operating tube adjacent said valve, spring means urging said tubes in such direction as to maintain tension on said tension means, and rigid means limiting the movement of said tubes and tension means toward the valve, said tension means comprising expansion rods in the path of the fluid flowing through the valve casing whereby to respond to the temperature thereof, and said rigid means comprising a thermal expansion member extending lengthwise of the valve casing and in the path of fluid flowing through said valve casing whereby the expansion and contraction of said rigid and said tension means compensate for the effect of the temperature of the fluid passing through the valve casing upon the expansion of said tubes.

6. A valve moving mechanism of the character described for controlling the flow of fluid, comprising a valve, double thermal expansion means for operating said valve, cooperating with double thermal expansion means for compensating for the surrounding temperature of said valve and means for heating said thermal expansion operating means for operating the aforesaid valve, said thermal expansion means for compensating for surrounding temperatures having a different coefficient of expansion than the thermal expansion operating means.

7. A valve moving mechanism of the character described for controlling the flow of fluid, comprising a valve, double thermal expansion means for operating said valve cooperating with double thermal expansion means for compensating for the surrounding temperature of said valve and means for heating said thermal expansion operating means for operating the aforesaid valve, said thermal expansion means for compensating for surrounding temperatures having a lower coefficient of expansion than the thermal expansion operating means.

8. Means for controlling the flow of fluid through a conduit comprising a valve casing, valve means in the casing including a member movable to increase or decrease the valve opening, a thermal expansion means in said casing cooperating with said member to move it in response to temperature changes of said means, and a second thermal expansion means connected with said first named thermal expansion means and responsive to temperatures of fluid flowing through said casing to oppose movement of the member by said first named thermal expansion means, said second named thermal expansion means having a different coefficient of expansion than the first named thermal expansion means.

9. Means for controlling the flow of fluid through a conduit comprising a valve casing, valve means in the casing including a member movable to increase or decrease the valve opening, a thermal expansion means in said casing cooperating with said member to move it in response to temperature changes of said means, and a second thermal expansion means connected with said first named thermal expansion means and responsive to temperatures of fluid flowing through said casing to oppose movement of the member by said first named thermal expansion means, said second named thermal expansion means having a different coefficient of expansion than the first named thermal expansion means, said first named thermal expansion means comprising two concentric tubes connected to the valve means and operable to move the valve means in proportion to the sum of their expansion.

10. A means for producing mechanical motion by thermal expansion comprising an assembly of metal tubes operable to expand and contract in response to temperature changes thereof, one of said tubes surrounding another tube, means for electrically heating said tubes, means extending from a fixed point and responsive to the surrounding temperature and connected with said assembly of tubes to give a movement of means fixed to one end of one of said tubes relative to said fixed point depending on the difference between the combined expansions of aforesaid electrically heated tubes and the combined expansions of said surrounding temperature responsive means, the overall expansion of said surrounding temperature responsive means per degree change in temperature being equal to the overall expansion of said assembly of metal tubes per degree change in temperature whereby the affixed means is held stationary when both the tubes and the surrounding temperature responsive means are subjected to the same change in temperature.

CHARLES A. MARTIN.